United States Patent [19]

Makley

[11] 4,436,572

[45] Mar. 13, 1984

[54] HAND-HELD LABELER

[75] Inventor: James A. Makley, Miamisburg, Ohio

[73] Assignee: Monarch Marking Systems, Inc., Dayton, Ohio

[21] Appl. No.: 423,374

[22] Filed: Sep. 24, 1982

Related U.S. Application Data

[63] Continuation-in-part of Ser. No. 272,795, Jun. 11, 1981, Pat. No. 4,352,710.

[51] Int. Cl.³ .............................................. B32B 31/00

[52] U.S. Cl. .................................... 156/384; 101/348; 156/541; 156/584

[58] Field of Search ............... 156/384, 542, 584, 541; 101/348

[56] References Cited

U.S. PATENT DOCUMENTS 4,158,590 6/1979 Hamisch .............................. 156/384

4,290,839 9/1981 Dabodie .............................. 156/384

*Primary Examiner*—David A. Simmons

*Attorney, Agent, or Firm*—Joseph J. Grass

[57] ABSTRACT

There is disclosed a hand-held labeler having a feed wheel for advancing a label-carrying web. The feed wheel is driven through a pawl and ratchet mechanism. The pawl and ratchet mechanism includes a pawl member and a ratchet wheel. The pawl member is slidably mounted for axial movement relative to the ratchet wheel. The ratchet wheel and the feed wheel are clutched for rotation as a unit during use, but they can be unclutched to effect relative adjustment of the ratchet wheel and the feed wheel. When the clutch is unclutched an additional clutch clutches the pawl member and the ratchet wheel to prevent movement of the ratchet wheel in either direction while the position of the feed wheel is adjusted.

10 Claims, 12 Drawing Figures

FIG-5
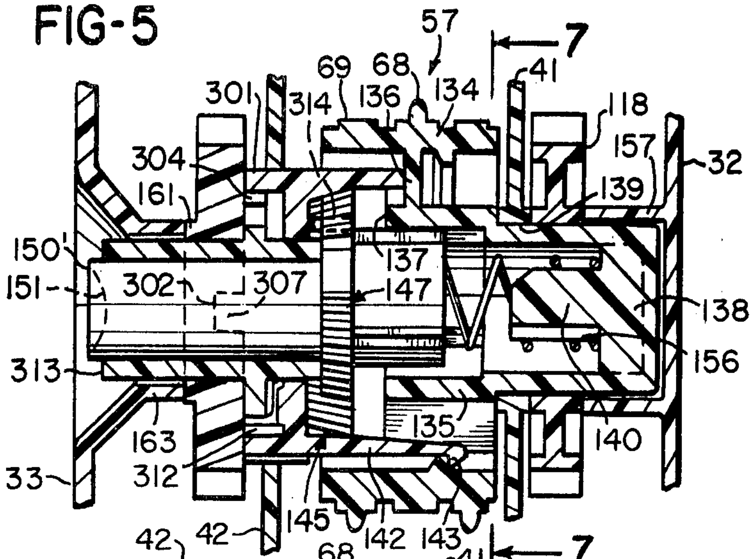
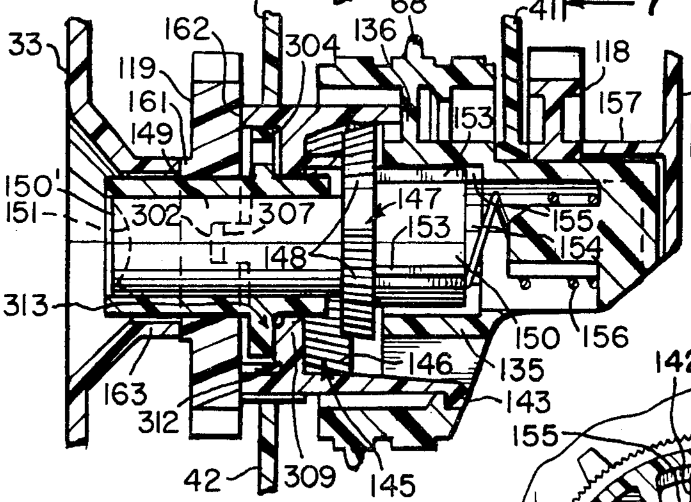
FIG-6
FIG-7
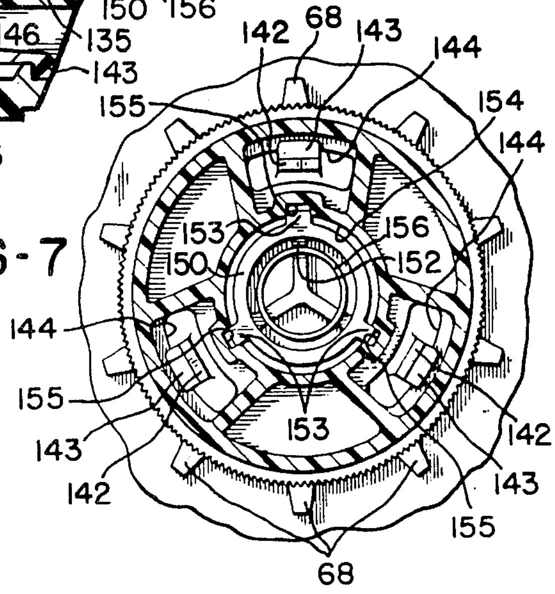

HOME POSITION

GEAR ROTATED 30° CCW
PAWL MEMBER HOME POSITION

GEAR ROTATED 120° CCW
PAWL MEMBER ROTATED 90° CCW

GEAR ROTATED 90° CCW
PAWL MEMBER ROTATED 90° CCW

HAND-HELD LABELER

CROSS-REFERENCE TO RELATED APPLICATION

This is a continuation-in-part of application Ser. No. 272,795, filed June 11, 1981, now U.S. Pat. No. 4,352,710.

BACKGROUND OF THE INVENTION

1. Field of the Invention

This invention relates to the field of hand-held labelers.

2. Brief Description of the Prior Art

U.S. Pat. No. 4,158,590 granted June 19, 1979 to Paul H. Hamisch, Jr. discloses an arrangement for adjusting the ratchet wheel and the feed wheel relative to each other. A clutch is used to engage and disengage the drive connection between the rachet wheel and the feed wheel. An anti-backup pawl prevents rotation of the ratchet wheel when the feed wheel is rotated in one direction but frictional forces may sometimes cause the ratchet wheel to be rotationally displaced when feed wheel is rotated in the opposite direction. The pawl is not capable of being axially displaced during use. U.S. patent application Ser. No. 06/068,843, filed Aug. 22, 1979 of Paul H. Hamisch, Jr. discloses a hand-held labeler having an adjustment arrangement similar in certain respects to the adjustment arrangement of U.S. Pat. No. 4,158,590, but in Ser. No. 06/068,843 the ratchet wheel has internal ratchet teeth and the pawls project outwardly toward the ratchet teeth. U.S. patent application Ser. No. 06/110,720 filed Jan. 9, 1980 of Robert M. Pabodie, now U.S. Pat. No. 4,290,839 discloses a hand-held labeler having a feed adjustment in which a clutch is provided to prevent rotation of the ratchet wheel in either rotational direction while the position of the feed wheel is being adjusted. The ratchet wheel has an elongate tubular shape and has internal ratchet teeth. The feed wheel is received about the ratchet wheel. The clutch is disposed inside the ratchet wheel.

SUMMARY OF THE INVENTION

The purpose of the invention is to provide a hand-held labeler with a simple, low-cost, compact and reliable feed adjustment. In such labelers it is desirable to register a label to be printed precisely with respect to a printing position or zone between a print head and a platen and with respect to a delaminator at which printed labels are delaminated from the carrier web. The carrier web is typically advanced by a toothed feed wheel. It has been found that it is easy to assemble a feed wheel and associated structure for adjusting the registry of the labels by locating the pawl and ratchet mechanism outside the feed wheel. According to a preferred embodiment, the means for moving the feed wheel includes a pawl and ratchet mechanism. The pawl and ratchet mechanism includes a ratchet wheel and a pawl member. Each time the actuator is manually operated, the pawl and ratchet mechanism advances the feed wheel one step to dispense a label and bring a new label to the printing position. In order to change the registration of the labels, the relative position of the ratchet and feed wheels is changed by operating a clutch as in U.S. Pat. No. 4,158,590 and rotating the feed wheel through a spline connection. The feed wheel is capable of being adjusted in either direction. The anti-backing pawl which is used to prevent reverse rotation of the ratchet and feed wheels during labeler operation also prevents the ratchet wheel from rotating in that reverse direction during adjustment of the ratchet and feed wheels. However, there is no means to positively prevent the ratchet wheel from being rotationally displaced when the feed wheel is being adjusted in its normal feed direction. Although a second clutch is provided to prevent such displacement in Ser. No. 06/110,720, the combination of elements, according to the present invention differs from the structure of both U.S. Pat. No. 4,158,590 and Ser. No. 06/110,720. According to the present invention, a clutch is provided to couple the ratchet wheel and the pawl member against relative rotational movement while the feed wheel is being adjusted relative to the ratchet wheel. According to a specific embodiment a drive gear and the pawl member ae connected through a drive connection which prevents relative rotation of the drive gear and the pawl member but enables the pawl member to shift axially relative to the drive gear and the ratchet wheel. There is a clutch between the pawl member and the ratchet wheel which is engaged whenever the clutch between the ratchet wheel and the feed wheel is disengaged and vice versa. This insures that there is no motion of the ratchet wheel while the feed wheel is being rotated in its normal feed direction. Absent the usual anti-backup pawl, the second clutch would also prevent rotation in the reverse direction.

According to an alternative embodiment of the invention, the same labeler construction can be used to feed a label of short length to the printing position between the print head and the platen. This enables the same compact size feed wheel to be used. A change in the feed wheel would require significant changes in other labeler components.

In accordance with a specific embodiment of the invention, there is provided a drive connection from gearing (used to drive the print head) to a feed wheel. The drive connection includes a pawl and ratchet mechanism and a lost-motion connection. By this arrangement, the gearing is able to drive the print head through the proper distance but because of the lost motion the gearing drives the feed wheel through a relatively short distance. The lost-motion connection is between a transfer gear of the gearing and the pawl and ratchet mechanism, but it can be between the pawl and ratchet mechanism and the feed wheel if desired. In the illustrated embodiment the lost-motion connection is between the gearing and the pawl member.

It is a further feature of the invention to provide a spline connection between the gearing and the pawl and ratchet mechanism.

BRIEF DESCRIPTION OF THE DRAWINGS

FIG. 5 is a sectional view through the assembled feed wheel, ratchet wheel, clutches, the gear, and frame and subframe members, showing the ratchet wheel and feed wheel clutched and showing the pawl member unclutched from the ratchet wheel;

FIG. 6 is a sectional view similar to FIG. 5 but showing the ratchet wheel and feed wheel unclutched and showing the pawl member clutched to the ratchet wheel;

FIG. 7 is a sectional view taken generally along line 7—7 of FIG. 5;

DESCRIPTION OF THE PREFERRED EMBODIMENT

Figure 1:
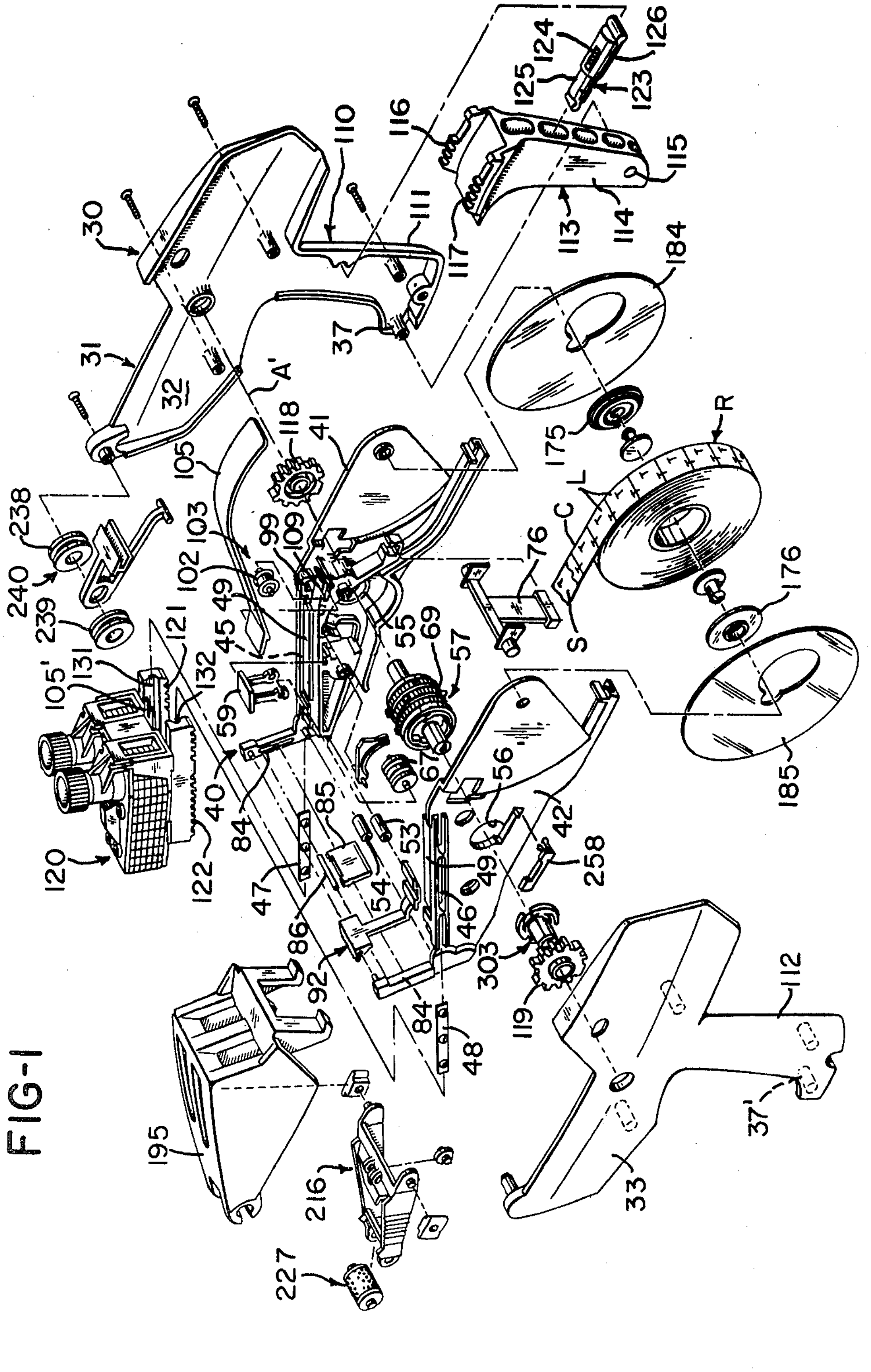
FIG. 1 is an exploded perspective view of a hand-held labeler embodying the invention.

Referring initially to FIG. 1, there is shown a label printing and applying apparatus or labeler generally indicated at 30 having a frame or body generally indicated at 31 which includes a frame section or body section 32 and a frame section or body section 33. The frame sections 32 and 33 are mates to eachother and are substantially mirror-images of each other. The frame 31 also includes a movable section 195 which can be pivoted to an open position to enable ink roller 227 of inking mechanism 216 to be changed. The frame 31 mounts an applicator 240 which includes a pair of rolls 238 and 239.

A subframe generally indicated at 40 is shown to include subframe sections 41 and 42. The subframe sections 41 and 42 have respective ball tracks 45 and 46 for receiving respective rolling-contact bearing members specifically ball-bearing strips 47 and 48. The subframe sections mount tubular rollers 53 and 54. The subframe sections 41 and 42 have respective round holes 55 and 56 for rotatably mounting a feed wheel assembly generally indicated at 57. The subframe sections 41 and 42 have dove-tail recesses for receiving a holder 59 for a die roller 66. The subframe sections 42 and 42 have respective non-circular recesses 74 for keying end portions of a latch 76. Marginal side portions of a platen 85 are received in the respective recesses 84 and marginal ends of a delaminator, specifically a peel roller 86, are received in the same elongated recesses 84. A hold-down and guide member is gnerally indicated at 92.

The subframe sections 41 and 42 have respective recesses 99 for retaining a brake roller 102 of a brake 103. The brake 103 also includes a pair of leaf springs 105′ carried by a print head 120.

A resilient device generally indicated at 105 mounted in the subframe 40 contacts the supporting or carrier web S and assists the gradual paying out of the composite web C of labels L.

Figure 3:
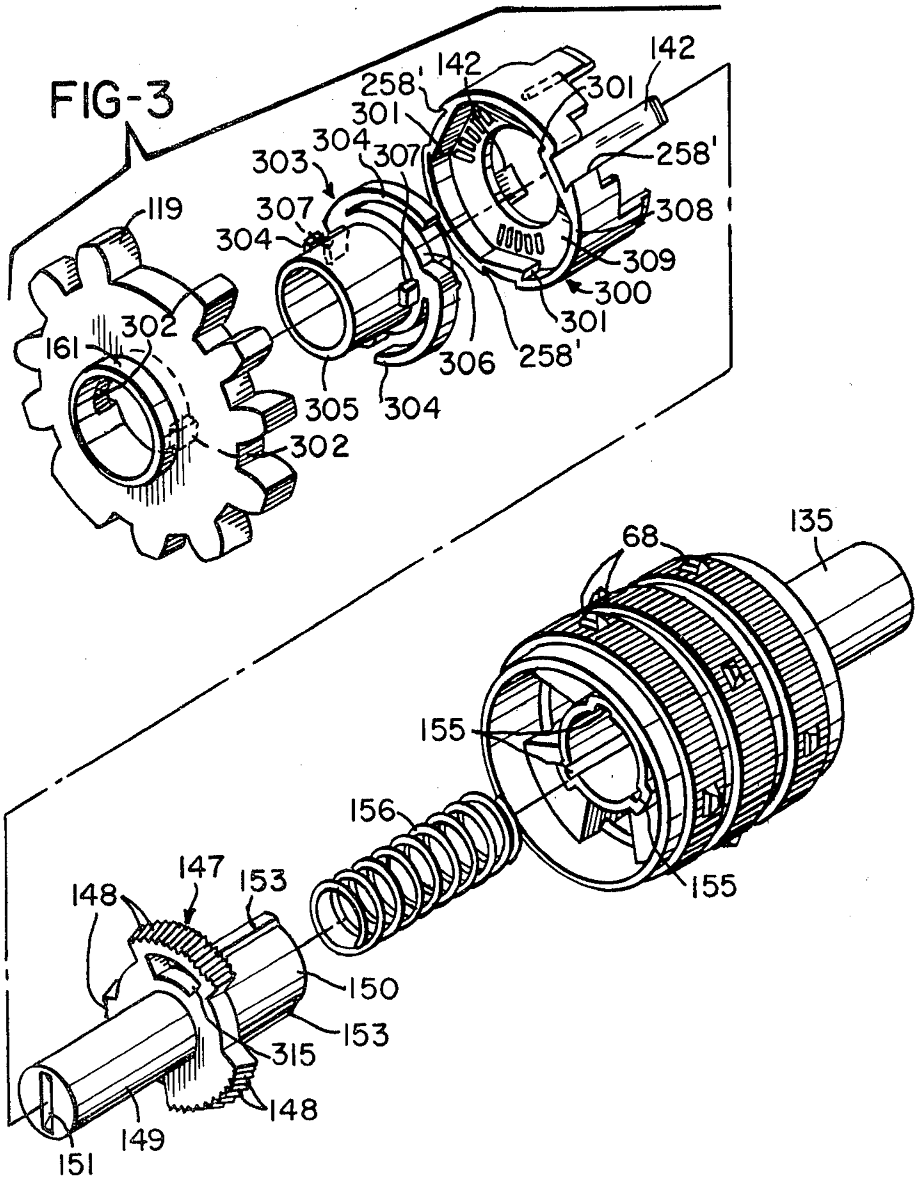
FIG. 3 is an exploded perspective view of improved structure according to the invention.
Figure 8:
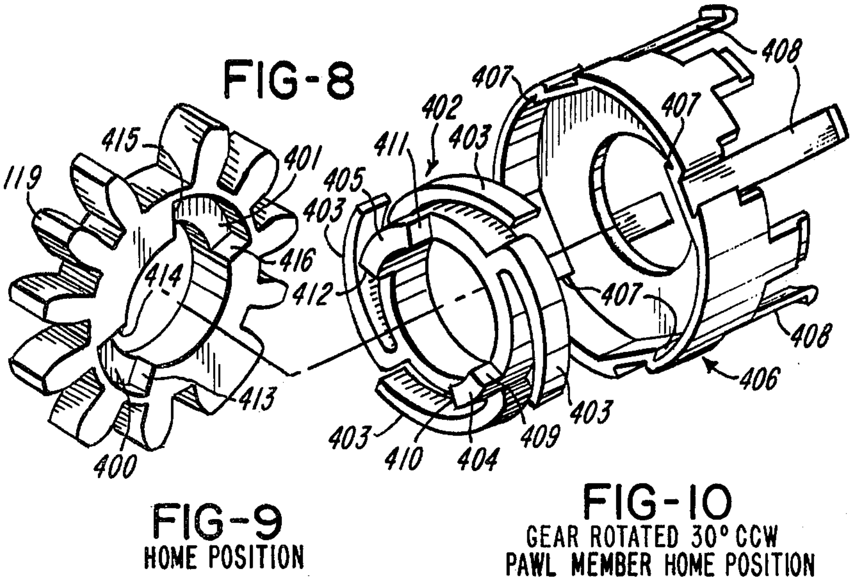
FIG. 8 is an exploded perspective view showing a pawl member, a ratchet wheel and a gear rotated relative to the pawl member for clarity.

The frame 31 has a handle generally indicated at 110 and includes handle portions 111 and 112. The posts 37 and 37′ are disposed at the outer end portion of the handle 110. A manually operable actuator generally indicated at 113 is shown to include a lever 114 having a hole 115. The posts 37 and 37′ are received in opposite ends of the hole 115 to pivotally mount the actuator 113. The actuator 113 is shown to include a pair of spaced-apart gear sections or segmental gears 116 and 117. The gear sections 116 and 117 mesh with respective gears 118 and 119 rotatably mounted on an axis A′. The print head generally indicated at 120 includes a pair of racks or gear sections 121 and 122 which mesh with respective gears 118 and 119. A resilient device generally indicated at 123 bears against the handle 110 and against the inside of the actuator 113 to urge the actuator 113, the feed assembly 57 and the print head 120 to their initial or rest positions as shown in FIG. 3. The resilient device 123 is shown to include a compression spring 124 which urges sections 125 and 126 to extended positions with respect to each other. The print head 120 has a pair of tracks 131 and 132 cooperable with respective tracks 45 and 46 of respective subframe sections 41 and 42. The ball bearing strip 47 is in rolling contact with and between the tracks 131 and 49 and the ball bearing strip 48 is in rolling contact with and between the track 132 and the other track 49. Accordingly, the print head 120 is mounted for straight line movement into and out of cooperation with the platen 85.

With reference to FIG. 5, the feed assembly 57 is shown to include the feed wheel 69 and a drive wheel, specifically ratchet wheel 300, having teeth 301 disposed in an annular arrangement. The feed wheel 69 and the ratchet wheel 130 are shown to be selectively movable with respect to each other. The feed wheel 69 is shown to have an annular rim 134 which is connected to a tubular hub portion 135 by a web 136. The tubular portion 135 has an open end 137 and a closed end portion 138. The tubular portion 135 is shown to be rotatably mounted in an annular hole 139 in the subframe section 41. A projection or retainer 140 joined to the end portion 138 extends in the axial direction. The ratchet wheel 130 includes a plurality, specifically three, spring fingers 142 having respective projections or teeth 143. The spring fingers 142 extend through elongated slots or holes 144 in the web 136. When the ratchet wheel 130 is assembled onto the feed wheel 69, the projections initially cam the spring fingers 142 inwardly and as the projections 143 pass through the holes 144, they expand radially outwardly so that the ratchet wheel 130 is coupled in assembled relationship to the feed wheel 69 for limited rotational movement. The ratchet wheel 130 is therefore adjustable to a limited extent as limited by the length of the holes 144. The ratchet wheel 130 has a clutch member 145 with an inner surface beveled with respect to axis A′ which is provided with a plurality of small closely spaced teeth 146. A clutch member generally indicated at 147 is shown to have a plurality of teeth 148 disposed on a bevel for cooperation with the teeth 146 of the clutch member 145. The clutch member 147 has tubular portions 149 and 150 which extend in opposite directions. The tubular portion 149 has a closed end portion 150′ with a coin slot 151. A three-lobed seat 152 is joined to the end portion 150′. The outer surface of the tubular portion 150 is splined, having what is illustrated as three splines 153 which are received in a splined hole 154 in the tubular portion 135. The splined hole has spline grooves 155. Accordingly, the clutch member 147 is keyed against rotation with respect to the feed wheel 69 but is slidable axially with respect to the feed wheel 69. The drive connection between the clutch member 147 and the feed wheel 69 is illustrated to be a splined connection. A compression spring 156, received within the tubular portions 135, 149 and 150, bears at its opposite ends against the end portion 138 and the seat 152. The projection 140 serves to locate and retain the spring 156 approximately axially disposed within the feed wheel 69. The position of the clutch members 145 and 147 relative to each other can be varied by the user by simply inserting a coin into the slot 151 and exerting an inward force to compress the spring 156, and as soon as the teeth 146 and 148 of the respective clutch members 145 and 147 are out of clutching engagement, the user can rotate the tubular portion 149 and hence the clutch member 147 and move it to a different selected position with respect to the clutch member 145. Rotation of the clutch member 147 causes simultaneous rotation of the feed wheel 69 because of the splined connection. As soon as the user releases the force on the end portion 150', the spring 156 returns the clutch member 147 into clutching engagement with the clutch member 145.

The gear 118 is shown to be rotatably mounted on the tubular portion 135 between the frame section 32 and the subframe section 41. The frame section 32 has an annular boss 157 which is shown to be out of contact with the tubular portion 135 but in contact with the gear 118. Accordingly, the gear 118 is captive between the subframe section 41 and the boss 157. The gear 119 has a tubular hub portion 161. The hub portion 161 is rotatably mounted on the tubular porton 149. The gear 119 abuts the terminal end 162 of the ratchet wheel 130 and the tubular portion 161 abuts the end of an annular flange 163 of the frame section 33. Neither the frame section 33 nor its flange 163 contacts the tubular portion 149. Accordingly, the gear 119 is held captive between the ratchet wheel 133 and the flange 163. It is apparent that the feed assembly 57 is mounted to the subframe 40 which in turn is mounted by the frame 31. The adjustment is made from only one side of the frame 31.

Figure 2:
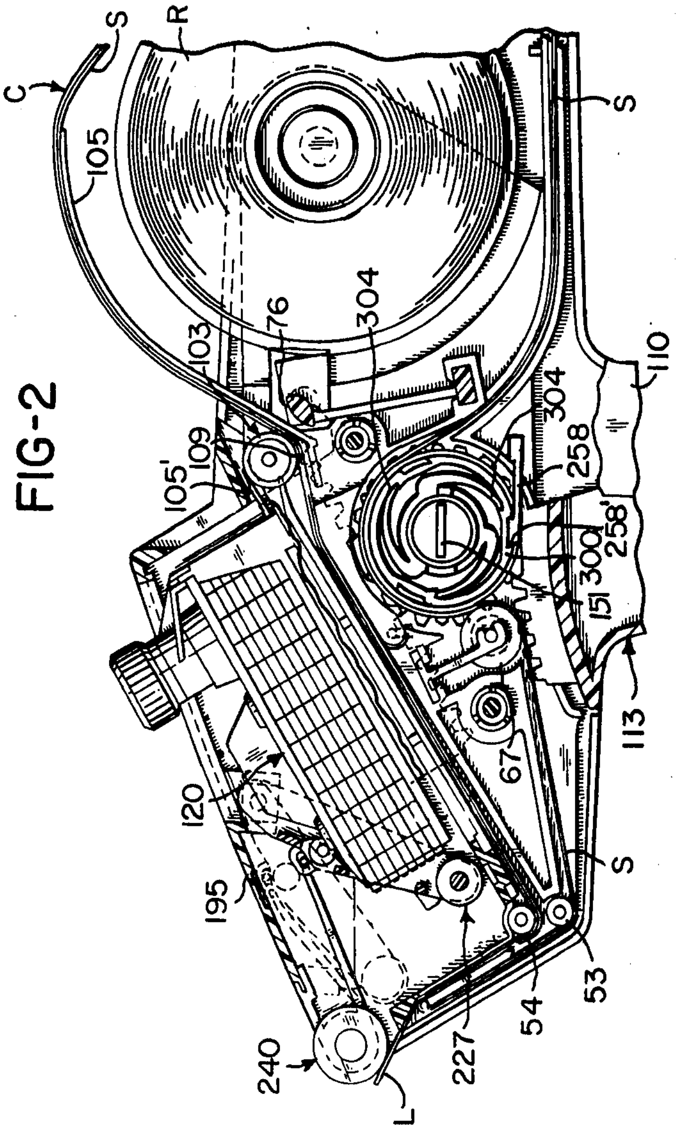
FIG. 2 is a fragmentary elevational view of the labeler.

With reference to FIG. 3, the gear 119 is shown to have spline slots or recesses 302. A pawl member 303 is shown to have three pawls 304 which cooperate with the ratchet teeth 301. The ratchet teeth 301 are internal and the pawls 304 are flexible and resilient and are urged into contact with the ratchet wheel as shown in FIGS. 2, 5 and 6. The pawl member 303 has a hub or hub portion 305. An annular flange 306 projects outwardly from the hub 305. The pawls 304 are joined to the outer surface of the flange 306. The hub has splines 307 which match up with spline slots or recesses 302. Thus, it is apparent that the pawl member 303 can shift axially between the positions shown in FIGS. 5 and 6.

Figure 4:
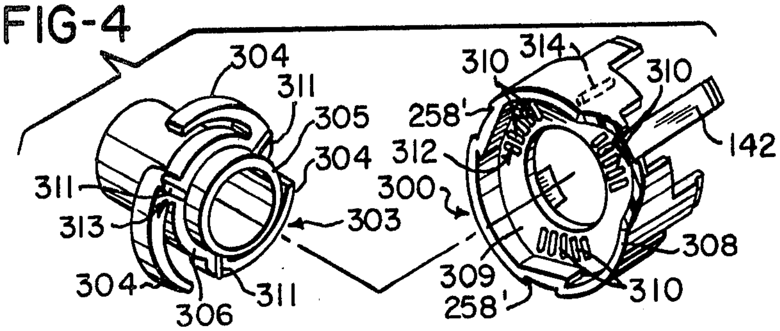
FIG. 4 is an exploded, rotated perspective view showing the ratchet wheel and the pawl member.

As seen in FIGS. 3 and 4, the ratchet wheel 300 includes an annular or tubular portion 308 and a radial web 309. The web 309 includes three sets of equally angularly spaced teeth 310. The flange 306 has three equally angularly spaced teeth 311 best visible in FIG. 4. The teeth 310 and 311 comprises respective clutch members 312 and 313 which in the normal position of use remains disengaged as shown in FIG. 5. The teeth 311 are molded integrally with the flange 306, and teeth 310 are molded integrally with web 309. In the normal position of use the clutch members 145 and 147 are engaged or clutched as also shown in FIG. 5.

When it is desired to adjust the position of the feed wheel 69 relative to the ratchet wheel 300, a coin is inserted into coin slot 151 to depress the shaft portion 149 to shift the clutch member 147 to the right as viewed in FIG. 5 out of the cooperation with the clutch member 145 to the position shown in FIG. 6. When depressing the shaft 149, the coin also contacts the terminal end 313 and the ratchet wheel is slid to the right as viewed in FIG. 5 to bring the clutch member 313 into engagement with the clutch member 312. When the clutch members 312 and 313 are engaged the ratchet wheel 300 is incapable of rotating. This is because the pawl member 303 is keyed to the gear 119 through the spline type drive connection provided by recesses 302 and 307 and because the gear 119 does not rotate so long as the actuator 113 does not move. Thus, the clutch members 312 and 313 keep the ratchet wheel 300 in its initial position while the position of the feed wheel 69 is being adjusted by turning the coin which has been inserted into the coin slot 151. The feed wheel 69 can be rotated in either rotational direction during adequate depression of the shaft 149. As soon as the member 149 is released the spring 156 returns the clutch member 147 and the associated shaft 149 and the pawl member 303 from their positions shown in FIG. 6 to their positions shown in FIG. 5 so that clutch members 145 and 147 are engaged again and clutch members 312 and 313 are disengaged again.

The anti-backup pawl 258 which is flexible and resilient but is attached to the subframe section 42 normally holds the ratchet wheel from rotation counter to its feed direction by engagement with teeth 258' at the outer periphery of the ratchet wheel 300. The clutch provided by clutch members 312 and 313 when clutched is useful in preventing the ratchet wheel 300 from advancing in the feed direction.

Without the invention, an attempt to adjust the feed wheel 69 while depressing and rotating the shaft 149 in the feed direction will not prevent rotation of the ratchet wheel due to friction. The invention assures that the ratchet wheel will not rotate while the adjustment is being made.

The ratchet wheel 300 has an axially extending pin 314 which extends into an arcuate slot 315 to prevent the ratchet wheel 300 from being assembled out of phase with the teeth 68 on the feed wheel 69.

When the user actuates the actuator 113, the gear segments 116 and 117 rotate gears 118 and 119 which move the pring head 120 into printing cooperation with the platen 85, and the pawl tooth 174 moves into position to cooperate with the next tooth 301 on the ratchet wheel 300. When the user releases the actuator 113 the resilient device 123 urges the actuator clockwise (FIG. 2) to return the print head 120 to its initial position (FIG. 2) and to drive the pawl member 303 to advance the ratchet wheel 300 and hence the feed wheel 69.

In operation, a label roll R is loaded onto the hub members 175 and 176 between the discs 184 and 185. The leading marginal end of the composite web C is passed over the resilient device 105, and between the brake roller 102 and surfaces 109. It is preferred to squeeze the actuator 113 slightly while the leading marginal end is being threaded through the labeler so that the print head 120 is moved away from the initial position to release the brake 103 and so that the brake roller 102 does not exert a braking force on the composite web C. The leading end portion of the composite web C is passed along the guideway provided by guides 49. The composite web C then passes out of the front of the apparatus 30 adjacent the roller 54 and thereupon the user inserts the composite web C between the platen 85 and the member 92. The composite web C is guided out of the apparatus to a position where it can be grasped by the user who will pull on the composite web C to draw several additional inches from the roll R. The composite web C is thereupon passed around the roller 53, and with the actuator 113 preferably in the fully squeezed or fully operated position, the leading end of the composite web C is inserted between the die roller 67 and the feed wheel 69. When the actuator 113 is released, the teeth 68 enter the supporting material web S. Repeated actuation of the actuator 113 will cause any slack to be taken out of the web S and thereupon labels L will be dispensed into label applying relationship with the applicator 240. In this position the trailing marginal end of the leading label L is still adhered to the web S. When the user applies the label L, the label L being applied is pulled from the web S. The brake 103 is effective to prevent the composite web C from being paid out of the roll R during application of a label L and an anti-backup pawl 258 (FIG. 1) which cooperates with the ratchet wheel 113 obviates loss of tension in the web S.

The embodiment of FIGS. 8 through 12 is identical to the embodiment of FIGS. 1 through 7 except as indicated below. The gear 119 includes spline slots 400 and 401. A pawl member generally indicated at 402 is like the pawl member 303 except that the pawl member 402 has four equally spaced pawls 405 instead of three and the ratchet wheel generally indicated at 406 includes four equally spaced ratchet teeth 407 instead of three ratchet teeth 301. Also the ratchet wheel 406 includes four spring fingers 408 instead of three such fingers 142 for the ratchet wheel 300. Correspondingly, the feed wheel 57 has cutouts for receiving four spring fingers 408 instead of the three spring fingers 142.

The splines or pins 404 and 405 are disposed in the respective spline slots 400 and 401. The slots 400 and 401 are shown to be arcuate and the splines 404 and 405 are also arcuate. The angular extent or width of the splines 404 and 405 is less than the angular extent or width of the respective slots 400 and 401. The spline 404 has two abutment faces 409 and 410 and the spline 405 has two abutment faces 411 and 412. The spline slot 400 has two abutment faces 413 and 414 and the spline slot 401 has two abutment faces 415 and 416.

Figure 9:
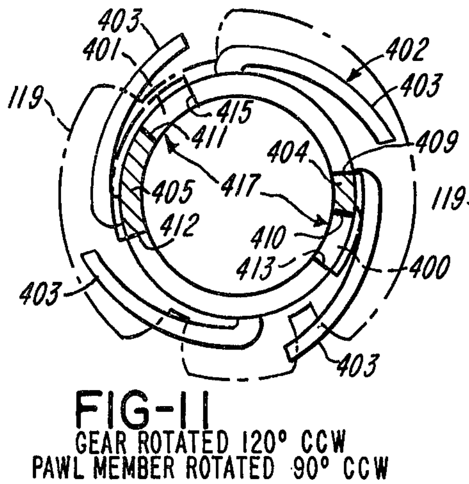
FIG. 9 is an elevational view of the pawl member partly in section with the gear depicted by phantom lines, the gear and the pawl member being shown in their respective home positions.
Figure 10:
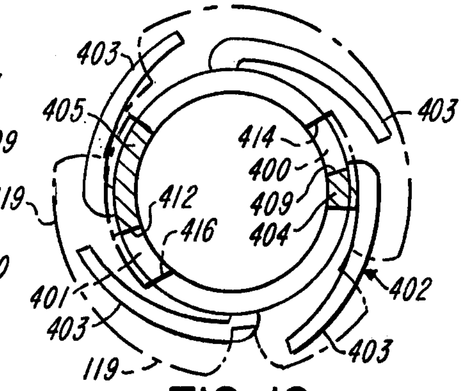
FIG. 10 is a view similar to FIG. 9, but showing the gear rotated 30 degrees counterclockwise from the home position.
Figure 11:
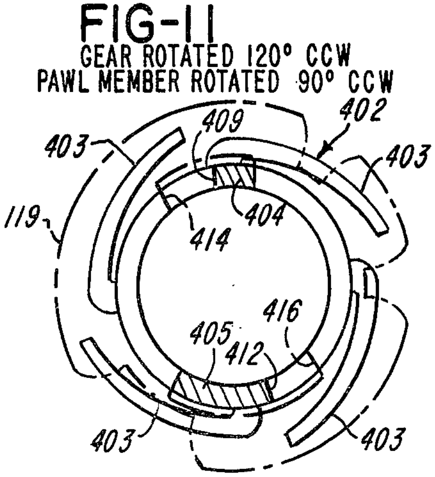
FIG. 11 is a view similar to FIG. 9, but showing the gear rotated 120 degrees counterclockwise and the pawl member rotated 90 degrees counterclockwise from the home position.
Figure 12:
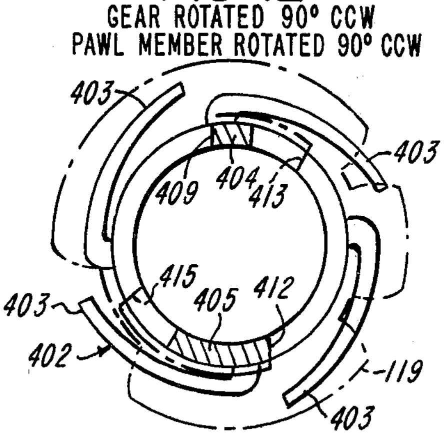
FIG. 12 is a view similar to FIG. 9 but showing both the gear and the pawl member rotated 90 degrees counterclockwise from the home position.

FIG. 9 shows the gear 119 and the pawl member 402 in their respective hole positions. The gear 119 is shown in phantom lines only, for clarity. When the actuator 113 is operated (clockwise in FIG. 2), the gear 119 rotates counterclockwise from the home position. During the first 30 degrees of rotation of the gear 119 the print head 120 moves toward the platen 85, but no movement is imparted to the pawl member 402 because the slots 400 and 401 are each 30 degrees greater in angular extent than the splines 404 and 405. FIG. 10 shows the gear 119 as having rotated counterclockwise (CCW) 30 degrees so that abutment faces 410 of the spline 404 is in contact with the abutment face 413 at the end of the slot 400 and the abutment face 411 of the spline 405 is in contact with the abutment face 415 at the end of the slot 401. As the gear 119 rotates counterclockwise through an additional 90 degrees, the splines 404 and 405 drive the pawl member 402 counterclockwise through 90 degrees to the position shown in FIG. 11 because the gear 119 and the pawl member 402 move as a unit. In the position shown in FIG. 11 the print head 120 has moved into printing cooperation with the platen 85. When manual pressure on the actuator 113 is released, the resilient device 123 causes the gear 119 to move clockwise (CW). When the gear 119 rotates through 30 degrees from the position shown in FIG. 11 to the position shown in FIG. 12 there is no movement of the pawl member 402 because of the length of the slots 400 and 401. In FIG. 12 the abutment face 409 of the spline 404 is in contact with the abutment face 414 and the abutment face 412 of the spline 405 is in contact with the abutment face 416. As the gear 119 rotates 90 degrees from the position shown in FIG. 12 to the home position shown in FIG. 9, the gear 119, the pawl member 402, the ratchet wheel 406 and the feed wheel 57 rotate clockwise as a unit, thereby advancing the carrier web S.

It is evident that in the embodiment of FIGS. 1 through 7, the carrier web S moves through a predetermined distance equal to one label length. The embodiment of FIGS. 8 through 12 enables a short label to be fed using the same labeler construction as in the embodiment of FIGS. 1 through 7. Only the gear with slots 400 and 401, the pawl member 402 with splines 404 and 405, the ratchet wheel 406 and the feed wheel 57 need be changed to enable the same basic labeler 30 to feed such a shorter length label. Importantly the diameter of the feed wheel does not need to be changed. Thus, only part of the movement of the gear 119 is used in the embodiment of FIGS. 8 through 12 to drive the feed wheel 57. It is evident that the lost-motion connection 417 provided by the splines 404 and 405 operating in spline slots 400 and 401 simply and effectively accomplishes the intended purpose with a minimum of parts.

Although the lost-motion connection is shown to be between the gear 119 and the pawl member 402 it can be anyplace from the gearing (gear sections 116 and 117, gears 118 and 119, and gear sections 121 and 122) and the feed wheel 57, for example, the lost-motion connection can be between the splines 153 and spline slots 155, or the gear could be arranged to drive the ratchet directly through a lost-motion connection and the ratchet wheel in turn could drive a pawl member which in turn could drive the feed wheel 57.

It is to be understood that when the actuator 113 moves from its initial or rest position to its (fully) actuated position, the gear 119 is driven through more than 120 degrees. This overtravel or lost-motion is solely for the purpose of insuring that each pawl 403 will pick up another respective ratchet tooth 407.

Other embodiments and modifications of this invention will suggest themselves to those skilled in the art, and all such of these as come within the spirit of this invention are included within its scope as best defined by the appended claims.

I claim:

1. Hand-held apparatus for printing and applying labels releasably secured by pressure sensitive adhesive to a carrier web, comprising: a housing including a handle, an actuator disposed at the handle, a movably mounted print head, a platen cooperable with the print head, gearing drivably connecting the actuator and the print head, means for delaminating printed labels from the carrier web, means for applying labels, a feed wheel engageable with a carrier web, a ratchet wheel for driving the feed wheel, a pawl member driven by the gearing and cooperable with the ratchet wheel, means providing a lost-motion connection between the gearing and the feed wheel so that the feed wheel is driven through a relatively small angle, and wherein the pawl member includes a plurality of pawls and the ratchet wheel has a plurality of ratchet teeth equal in number to the number of pawls.

2. Hand-held apparatus for printing and applying labels releasably secured by pressure sensitive adhesive to a carrier web, comprising: a housing including a handle, an actuator disposed at the handle, a movably mounted print head, a platen cooperable with the print head, gearing drivably connecting the actuator to the print head, means for delaminating printed labels from the carrier web, means for applying labels, a feed wheel engageable with a carrier web, a ratchet wheel for driving the feed wheel, a pawl member driven by the gearing and cooperable with the ratchet wheel, means providing a lost-motion connection between the gearing and the feed wheel so that the feed wheel is driven through a relatively small angle, and wherein the lost-motion connection connects the gearing directly to the pawl member.

3. Hand-held apparatus for printing and applying labels releasably secured by pressure sensitive adhesive to a carrier web, comprising: a housing having a handle, an actuator disposed at the handle, a movably mounted print head, a platen cooperable with the print head, means for delaminating printed labels from the carrier web, means for applying labels, a feed wheel cooperable with a carrier web, a pawl and ratchet mechanism driven by the gearing for driving the feed wheel, the pawl and ratchet mechanism including a ratchet wheel and a pawl member cooperable with the ratchet wheel, and a lost-motion spline connection between the gearing and the pawl and ratchet mechanism.

4. Hand-held apparatus as defined in claim 3, wherein the spline connection includes at least one spline disposed in a spline slot, wherein the spline slot is wider than the spline to provide lost-motion.

5. Hand-held apparatus as defined in either claim 3 or claim 4, wherein the spline connection connects the gearing directly to the pawl member.

6. Hand-held apparatus as defined in claim 4, wherein the gearing includes a gear, and wherein the spline slot is in one of the gear and the pawl member, and wherein the spline is in the other of the gear and the pawl member.

7. Hand-held apparatus for printing and applying labels releasably secured by pressure sensitive adhesive to a carrier web comprising: a housing including a handle, an actuator disposed at the handle, a gear section connected to the actuator, a movably mounted print head, a platen cooperable with the print head, a gear section on the print head, a transfer gear in mesh with the gear sections so that manual actuation of the actuator moves the print head into printing cooperation with the platen, means for delaminating printed labels from the carrier web, means for applying labels, a feed wheel engageable with the carrier web, a ratchet wheel, a pawl member cooperable with the ratchet wheel, means defining a connection between the transfer gear and the pawl, the connection including a pair of spaced abutment faces and a pin alternately cooperable with the abutment faces, wherein when the transfer gear is driven in one direction in response to actuation of the actuator the pin cooperates with one of the abutment faces only after the gear rotates from a home position through a predetermined angle to an actuated position and wherein when the transfer gear is driven in the opposite direction the pin cooperates with the other abutment face only after the transfer gear rotates through the predetermined angle as the transfer gear returns to its home position.

8. Hand-held apparatus as defined in any one of claims 1, 2, 3 or 7, wherein the pawl member includes four and only four equally spaced-apart pawl members and the ratchet wheel includes four and only four equally spaced apart teeth.

9. Hand-held apparatus for printing and applying labels releasably secured by pressure sensitive adhesive to a carrier web, comprising: a housing including a handle, an actuator disposed at the handle, a movably mounted print head, a platen cooperable with the print head, gearing drivingly connecting the actuator and the print head, means for delaminating printed labels from the carrier web, means for applying labels, a feed wheel engageable with a carrier web, and means coupling the gearing and the feed wheel including a pawl, a ratchet wheel cooperable with the pawl, means providing a pair of spaced abutment faces, and a pin alternately cooperable with the abutment faces, wherein when the gearing is driven in one direction in response to actuation of the actuator the pin cooperates with one of the abutment faces only after the gearing rotates from a home position through a predetermined angle to an actuated position, and wherein when the gearing is driven in the opposite direction the pin cooperates with the other abutment face only after the gearing rotates from the actuated position through the predetermined angle as the transfer gear returns to its home position.

10. Hand-held apparatus for printing and applying labels releasably secured by pressure sensitive adhesive to a barrier web, comprising: a housing including a handle, an actuator disposed at the handle, a movably mounted print head, a platen cooperable with the print head, means including gearing drivably connecting the actuator and the print head, means for delaminating printed labels from the carrier web, means for applying labels, a feed wheel engageable with the carrier web, means for moving the feed wheel in response to movement of the gearing including a pawl and ratchet mechanism and a lost-motion connection so that the feed wheel is driven through a relatively small angle.

* * * * *

UNITED STATES PATENT AND TRADEMARK OFFICE

CERTIFICATE OF CORRECTION

PATENT NO. : 4,436,572

DATED : March 13, 1984

INVENTOR(S) : James A. Makley

It is certified that error appears in the above-identified patent and that said Letters Patent are hereby corrected as shown below:

Title Page, "References Cited" after "4,290,839 9/1981" "Dabodie" should be --Pabodie--. Column 3, line 33, "eachother" should be --each other--; line 56, "generally" has been misspelled. Column 5, line 57, "comprises" should be --comprise--. Column 6, line 44, "pring" should be --print--.

Applicant's Error

Column 10, line 43, "barrier" should be --carrier--.

Signed and Sealed this

*Twenty-fifth* Day of *September 1984*

[SEAL]

*Attest:*

GERALD J. MOSSINGHOFF

*Attesting Officer* *Commissioner of Patents and Trademarks*